United States Patent
Singh et al.

(10) Patent No.: US 12,103,685 B2
(45) Date of Patent: Oct. 1, 2024

(54) METHODS AND SYSTEMS TO PROVIDE SERVICE LEVELS FOR AIRCRAFT IN-FLIGHT CONNECTIVITY COMMUNICATION SYSTEMS BASED UPON SSIDS

(71) Applicant: GOGO BUSINESS AVIATION LLC, Broomfield, CO (US)

(72) Inventors: Yashvardhan Singh, Broomfield, CO (US); John F. Kelly, Broomfield, CO (US); Mark Mastandrea, Broomfield, CO (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 17/335,630

(22) Filed: Jun. 1, 2021

(65) Prior Publication Data

US 2022/0289385 A1    Sep. 15, 2022

Related U.S. Application Data

(60) Provisional application No. 63/159,311, filed on Mar. 10, 2021.

(51) Int. Cl.
*H04W 40/02* (2009.01)
*B64D 11/00* (2006.01)
(Continued)

(52) U.S. Cl.
CPC ....... *B64D 11/0015* (2013.01); *H04W 40/026* (2013.01); *H04W 40/04* (2013.01); *H04W 72/29* (2023.01); *H04W 76/12* (2018.02)

(58) Field of Classification Search
CPC ..... H04L 41/0663; H04L 43/10; H04L 45/22; H04L 45/38; H04L 45/741; H04L 47/18;
(Continued)

(56) References Cited

U.S. PATENT DOCUMENTS 8,184,530 B1 *   5/2012   Swan ............... H04W 76/12
                                                370/230
8,885,539 B2 * 11/2014   Trudeau .......... H04L 12/2854
                                                370/235

(Continued)

OTHER PUBLICATIONS

TR-321, Public Wi-Fi Access in Multi-Service Broadband Networks, Broadband Forum Technical Reports, Issue: 01, Issue Date: Nov. 2015.

(Continued)

*Primary Examiner* — Nathan S Taylor
(74) *Attorney, Agent, or Firm* — MARSHALL, GERSTEIN & BORUN LLP; Randall G. Rueth

(57) ABSTRACT

Methods and systems to provide service levels for aircraft in-flight connectivity network systems based on service set identifiers (SSIDs) are disclosed. A disclosed method includes providing a first wireless access point having a first SSID; providing a second wireless access point having a second, different SSID; segregating users by providing instructions regarding which of the first and second SSIDs to use to access services; tagging first data received via the first SSID with a first differentiated services code point (DSCP) value; tagging second data received via the second SSID with a second, different DSCP value; and handling the first and second data with different service levels based upon the first and second DSCP values.

14 Claims, 3 Drawing Sheets

(51) Int. Cl.
*H04W 40/04* (2009.01)
*H04W 72/29* (2023.01)
*H04W 76/12* (2018.01)

(58) Field of Classification Search
CPC . H04L 47/22; H04L 47/2408; H04L 47/2441; H04L 47/31; H04L 47/50; H04L 63/0236; H04L 63/0272; H04L 69/22; H04W 8/04
See application file for complete search history.

(56) References Cited

U.S. PATENT DOCUMENTS

| | | | | |
|---|---|---|---|---|
| 2006/0165103 | A1* | 7/2006 | Trudeau | H04L 12/2854 370/428 |
| 2007/0064673 | A1* | 3/2007 | Bhandaru | H04W 40/246 370/351 |
| 2008/0192692 | A1* | 8/2008 | Chari | H04L 47/2416 370/331 |
| 2009/0129386 | A1* | 5/2009 | Rune | H04L 12/4641 370/392 |
| 2010/0202397 | A1* | 8/2010 | Chari | H04L 47/50 370/329 |
| 2011/0116461 | A1* | 5/2011 | Holt | H04L 47/2408 370/329 |
| 2011/0268027 | A1 | 11/2011 | Nogawa | |
| 2011/0268096 | A1* | 11/2011 | Lauer | H04B 7/18508 370/338 |
| 2013/0155849 | A1* | 6/2013 | Koodli | H04L 45/308 370/230 |
| 2013/0155851 | A1* | 6/2013 | Koodli | H04L 45/308 370/230 |
| 2013/0155965 | A1* | 6/2013 | Koodli | H04W 4/021 370/329 |
| 2013/0223230 | A1* | 8/2013 | Swaminathan | H04W 76/10 370/241 |
| 2015/0327052 | A1* | 11/2015 | Ghai | H04W 48/02 370/328 |
| 2016/0142325 | A1* | 5/2016 | Adamczyk | H04L 63/102 370/235 |
| 2017/0289837 | A1* | 10/2017 | Duo | H04L 47/2433 |
| 2018/0123950 | A1* | 5/2018 | Garg | H04L 63/0236 |
| 2019/0200283 | A1* | 6/2019 | Graybeal | H04W 48/18 |
| 2020/0092253 | A1* | 3/2020 | Gray | H04L 67/02 |
| 2020/0274796 | A1* | 8/2020 | Garg | H04L 47/2408 |
| 2021/0328914 | A1* | 10/2021 | Garg | H04L 41/0663 |
| 2021/0409999 | A1* | 12/2021 | Chilla | H04W 40/04 |

OTHER PUBLICATIONS

Intenational Application No. PCT/US2022/016512, International Search Report and Written Opinion, May 27, 2022.
International Application No. PCT/US2022/016512, Second Written Opinion, mailing date Feb. 15, 2023.
International Application No. PCT/US2022/016512, International Preliminary Report on Patentability, mailing date Jun. 16, 2023.

* cited by examiner

METHODS AND SYSTEMS TO PROVIDE SERVICE LEVELS FOR AIRCRAFT IN-FLIGHT CONNECTIVITY COMMUNICATION SYSTEMS BASED UPON SSIDS

CROSS-REFERENCE TO RELATED APPLICATION

This application claims the priority benefit of U.S. Provisional Patent Application No. 63/159,311, filed Mar. 10, 2021, and entitled "METHOD OF TRAFFIC SEGREGATION AND ROUTING BASED ON SSID FOR AIRCRAFT IN-FLIGHT CONNECTIVITY (IFC) NETWORK SYSTEMS," the entirety of which is incorporated herein by reference.

TECHNICAL FIELD

The following disclosure relates generally to aircraft in-flight connectivity communication systems, and, more particularly, to systems and methods to provide service levels for aircraft in-flight connectivity communication systems based upon service set identifiers (SSIDs).

BACKGROUND

Aircraft in-flight connectivity communication systems enable users to, among other things, access services via a satellite communications network and/or an air-to-ground (ATG) communications network. The amount of data that can be transferred via such networks may be limited and/or restricted due to achievable bandwidth and/or cost. Thus, for example, it may desirable to limit crew access to multimedia services, while providing owners unlimited access to all services. Accordingly, there is a need for methods and systems to provide service levels for aircraft in-flight connectivity communication systems.

SUMMARY

In one embodiment, a method includes providing a first wireless access point having a first service set identifier (SSID); providing a second wireless access point having a second, different SSID; segregating users by providing instructions regarding which of the first and second SSIDs to use to access services; tagging first data received using the first SSID with a first differentiated services code point (DSCP) value; tagging second data received using the second SSID with a second, different DSCP value; and handling the first and second data with different service levels based upon the first and second DSCP values.

In variations of this embodiment, the method further includes instructing a first user to access services using the first SSID, and instructing a second user to access services using the second SSID.

In variations of this embodiment, handling the first and second data with different service levels includes performing traffic engineering based upon the first and second DSCP values.

In variations of this embodiment, handling the first and second data with different service levels includes determining which services can be accessed based upon the first and second DSCP values.

In variations of this embodiment, handling the first and second data with different service levels includes accounting for services used based upon the first and second DSCP values.

In variations of this embodiment, handling the first and second data with different service levels includes routing data based upon the first and second DSCP values.

In variations of this embodiment, routing data based upon the first and second DSCP values includes routing the first data via a first modem, and routing the second data via a second modem.

In another embodiment, a system includes a first wireless access point having a first service set identifier (SSID); a second wireless access point having a second, different SSID, wherein users are segregating by instructing them which of the first and second SSID to use to access services; a routing engine configured to tag first data received via the first SSID with a first differentiated services code point (DSCP) value, and to tag second data received via the second SSID with a second, different DSCP value; and a transport network configured to handle the first and second data with different service levels based upon the first and second DSCP values.

In variations of this embodiment, the transport network includes a modem configured to handle the first and second data with different service levels based upon the first and second DSCP values.

In variations of this embodiment, the transport network includes a data center configured to handle the first and second data with different service levels based upon the first and second DSCP values.

In variations of this embodiment, a first user is instructed to access services using the first SSID, and a second user is instructed to access services using the second SSID.

In variations of this embodiment, handling the first and second data with different service levels includes performing traffic engineering based upon the first and second DSCP values.

In variations of this embodiment, handling the first and second data with different service levels includes determining which services can be accessed based upon the first and second DSCP values.

In variations of this embodiment, handling the first and second data with different service levels includes accounting for services used based upon the first and second DSCP values.

In variations of this embodiment, handling the first and second data with different service levels includes routing data based upon the first and second DSCP values.

In variations of this embodiment, routing data based upon the first and second DSCP values includes routing the first data via a first modem, and routing the second data via a second modem.

In yet another embodiment, a non-transitory computer-readable storage medium storing processor-executable instructions, that when executed cause a machine to receive first data tagged with a first differentiated services code point (DSCP) value based upon being received using a first service set identifier (SSID); receive second data tagged with a second DSCP value based upon being received using a second SSID; and handle the first and second data with different service levels based upon the first and second DSCP values.

In variations of this embodiment, the non-transitory, machine-readable storage medium includes further instructions that, when executed, cause the machine to handle the first and second data with different service levels by performing traffic engineering based upon the first and second DSCP values.

In variations of this embodiment, the non-transitory, machine-readable storage medium includes further instructions that, when executed, cause the machine to handle the first and second data with different service levels by determining which services can be accessed based upon the first and second DSCP values.

In variations of this embodiment, the non-transitory, machine-readable storage medium includes further instructions that, when executed, cause the machine to handle the first and second data with different service levels by routing the first data via a first modem, and routing the second data via a second modem.

Figure 1:
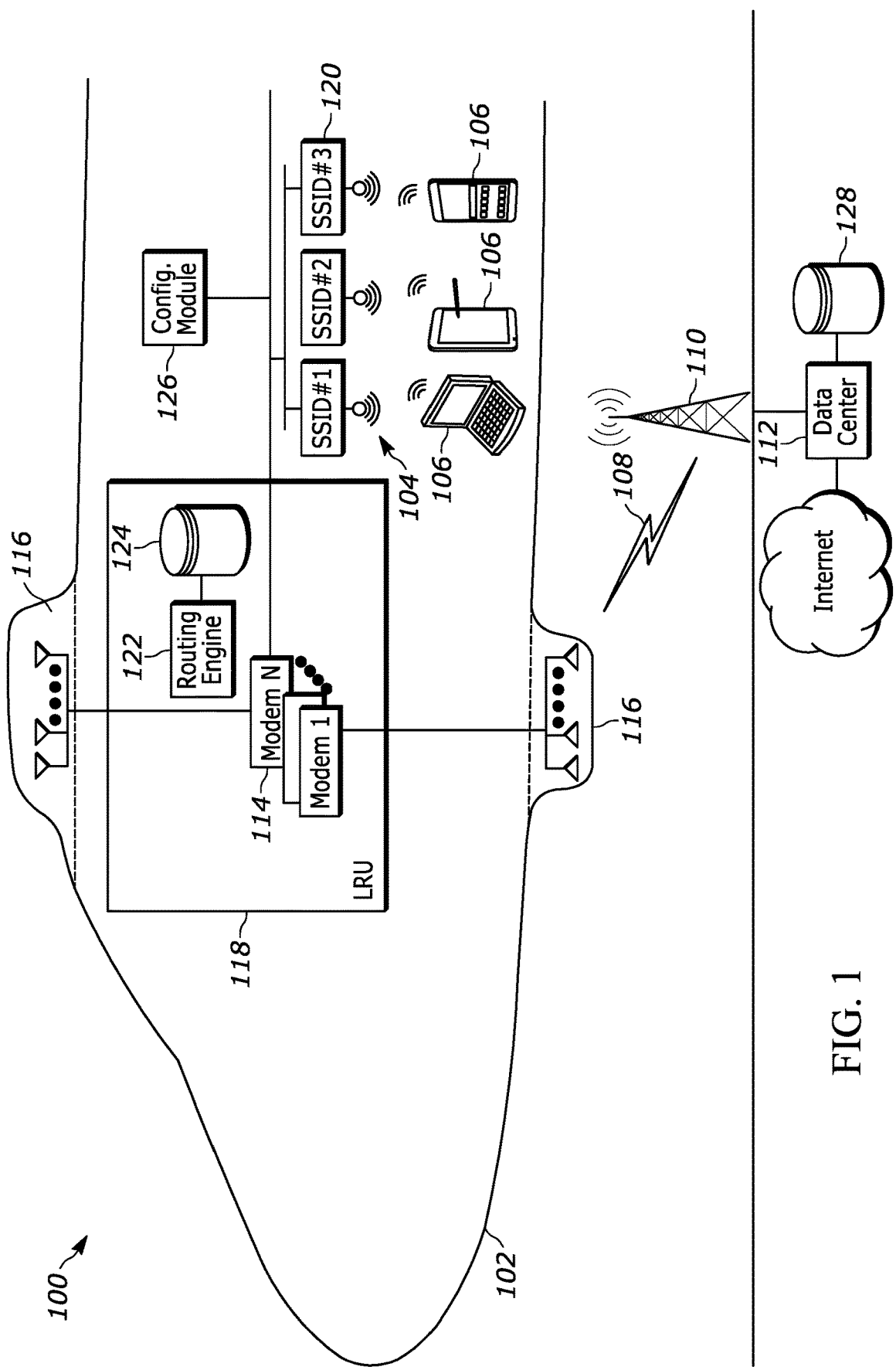
FIG. 1 is a block diagram of an example aircraft in-flight connectivity communication system constructed in accordance with disclosed embodiments, and shown in an example environment of use.

The figures depict embodiments of this disclosure for purposes of illustration only. One skilled in the art will readily recognize from the following discussion that alternate embodiments of the structures and methods illustrated herein may be employed without departing from the principles set forth herein.

In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

To provide different service levels for aircraft in-flight connectivity communication systems, disclosed methods and systems provide multiple wireless access points having different associated SSIDs. Users are segregated into different service level groups (e.g., owner, passenger, crew, etc.) by instructing them which SSID to use to access services. For example, passengers are instructed to use SSID #1, crew are instructed to use SSID #2, etc. As data is received, the differentiated services code point (DSCP) value in the 8-bit differentiated services field (DS field) in the IP header of the data is set based upon the SSID. For example, data received using SSID #1 has its DSCP value set to DSCP #1, data received using SSID #2 has its DSCP value set to DSCP #2, etc. The DSCP values are subsequently used to segregate users and/or provide different service levels. For example, DSCP values may be used to (i) control which type(s) of services a user may access, (ii) control the amount of data that may be sent, (iii) control the rate at which data may be sent, (iv) control, when multiple modems are available, the modem used to send data, (v) perform traffic engineering, (vi) control quality of service (QoS), (vii) to account for the amount of data sent, etc.

Reference will now be made in detail to non-limiting examples, some of which are illustrated in the accompanying drawings.

FIG. 1 depicts an embodiment of an exemplary aircraft in-flight connectivity communication system 100 capable of providing different service levels as described herein. The communication system 100 may be contained in a vehicle 102. The vehicle 102 may be associated with at least two communication links: (i) one or more on-board communication links 104 to provide communication services to electronic devices 106 while the electronic devices 106 are disposed within the vehicle 102, and (ii) a communication link 108 between the vehicle 102 and a terrestrial base station 110 connected to a data center 112.

Although the communication link 108 is depicted as a communication link of an air-to-ground (ATG) network and referred to herein in the singular tense, it should be appreciated that other network configurations are envisioned. For example, the communication link 108 may be a satellite-based communication link, an onboard network (e.g., for an inflight entertainment system, an FTP server, etc.), etc. Furthermore, in some embodiments, multiple communication links 108 may be associated with the vehicle 102, e.g., the vehicle 102 may be communicatively connected to both an ATG communication link 108 and a satellite-based communication link 108.

To this end, the communication system 100 may contain one or more modems 114 configured to be compatible with a plurality of different communication standards utilized by the ATG communication link 108. For example, the communication link 108 may utilize communication protocols associated with terrestrial communications (e.g., TDMA, GSM, CDMA, GSM, LTE, WiMAX, Wi-Fi, etc.) and/or associated with frequencies in the $K_a$ band, the $K_u$ band, the L band, and/or any other suitable wireless communication frequency bands. Each of the plurality of modems 114 may be connected to at least one respective antenna 116. The modems 114 may be implemented within a line replaceable unit (LRU) 118.

Generally speaking, the electronic devices 106 may send and receive data over the on-board communication links 104 via one or more on-board wireless access points 120. The wireless access points 120 are assigned different SSIDs (e.g., SSID#1, SSID#2, SSID#3, etc.), and users of the on-board communication links 104 are segregated into groups by assigning them to use particular SSIDs to access the on-board communication links 104. The electronic devices 106 may include any mobile computing device, such as a smartphone, a tablet, a laptop computer, a personal digital assistant, an e-reader, smart glasses, smart watches, or any other mobile computing device capable of wireless communications.

A routing engine 122 may determine that some of the data transmitted by the electronic devices 106 is addressed to a location external to the vehicle 102. Accordingly, the plurality of modems 114 may forward and/or transmit this data to the terrestrial base station 110 via the communication link 108 for routing to the data's ultimate destination. In the illustrated example, the routing engine 122 is implemented together with the modems 114 in the LRU 118.

In addition to routing data, the routing engine 122 tags the data transmitted by an electronic device 106 with a DSCP value in the 8-bit DS field in the IP header of the data based upon the SSID of the wireless access point 120 used to transmit the data. For example, data transmitted using SSID #1 has its DSCP value set to DSCP #1, data transmitted using SSID #2 has its DSCP value set to DSCP #2, etc. The DSCP values are subsequently used to segregate users and/or provide different service levels. The mapping of SSID to DSCP values may be configured in a table, database, etc. 124 via a configuration module 126. The configuration module 126 may be also be used to configure a table, database, etc. 128 used by the data center 112 to determine which rules to apply based upon the DSCP values to provide different service levels in accordance with DSCP values.

For example, DSCP values may be used by the data center 112 to control which type(s) of services a user may access. For instance, data packets with a certain DSCP value (e.g., associated with crew) may be blocked from being sent to and/or received from multimedia servers, while data packets with other DSCP values (e.g., associated with passengers and/or owners) may be permitted.

For example, DSCP values may be used by the data center 112, the routing engine 122, the terrestrial base station 110, the modems 114, etc. to restrict the rate at which data can be sent and/or received, to limit the amount of data sent and/or received during a period of time, etc.

For example, DSCP values may be used by the data center 112, the routing engine 122, the terrestrial base station 110, the modems 114, etc. to, when multiple modems 114 are available, control which modem(s) 114 are used to send and/or receive data. For instance, data packets with a certain DSCP value (e.g., associated with crew) may be blocked from being sent and/or received via a satellite-based communication link 108, while data packets with other DSCP values (e.g., associated with passengers and/or owners) may be sent via any type of modem.

For example, DSCP values may be used by the data center 112, the routing engine 122, the terrestrial base station 110, the modems 114, etc. to perform traffic engineering and/or control QoS. For instance, data packets with a certain DSCP value (e.g., associated with crew) may be transmitted and/or received with a lower priority than data packets with other DSCP values (e.g., associated with passengers and/or owners).

For example, DSCP values may be used by the data center 112, the routing engine 122, the terrestrial base station 110, the modems 114, etc. to account for the amount of data transmitted and/or received by different groups of user. For instance, a group traveling on a flight might be assigned to use a particular SSID and then charged for the amount of data used by the group based on their associated DSCP separate from the data used by others assigned to other SSIDs on the flight.

The communication system 100 may also include servers associated with network features other than communication services. For example, the on-board wireless network 100 may include an in-flight entertainment (IFE) server (not shown) for providing in-flight entertainment (e.g., video on demand, satellite TV, etc.). It should be appreciated that although IFE refers to a vehicle "in flight," any action or description associated with an IFE server envisions the performance by an additional or alternative entertainment server associated with terrestrial and/or nautical vehicles.

While the vehicle 102 depicted in FIG. 1 is an airplane, the communication system 100 may be implemented in other types of vehicles including a bus, a train, a boat, a car, a helicopter, a submarine, etc. Beyond vehicles, the communication system 100 may be implemented in public locations such as a stadium, a convention center, a mall, etc.

While FIG. 1 depicts the airplane 102 in communication with the terrestrial base station 110, it is envisioned that the airplane 102 may be in communication with any number of terrestrial base stations. To this end, the communication system 100 may contain a plurality of terrestrial base stations disposed across a geographic region enabling the airplane 102 to maintain a communication link over the ATG network 108 throughout the course of a journey.

Figure 2:
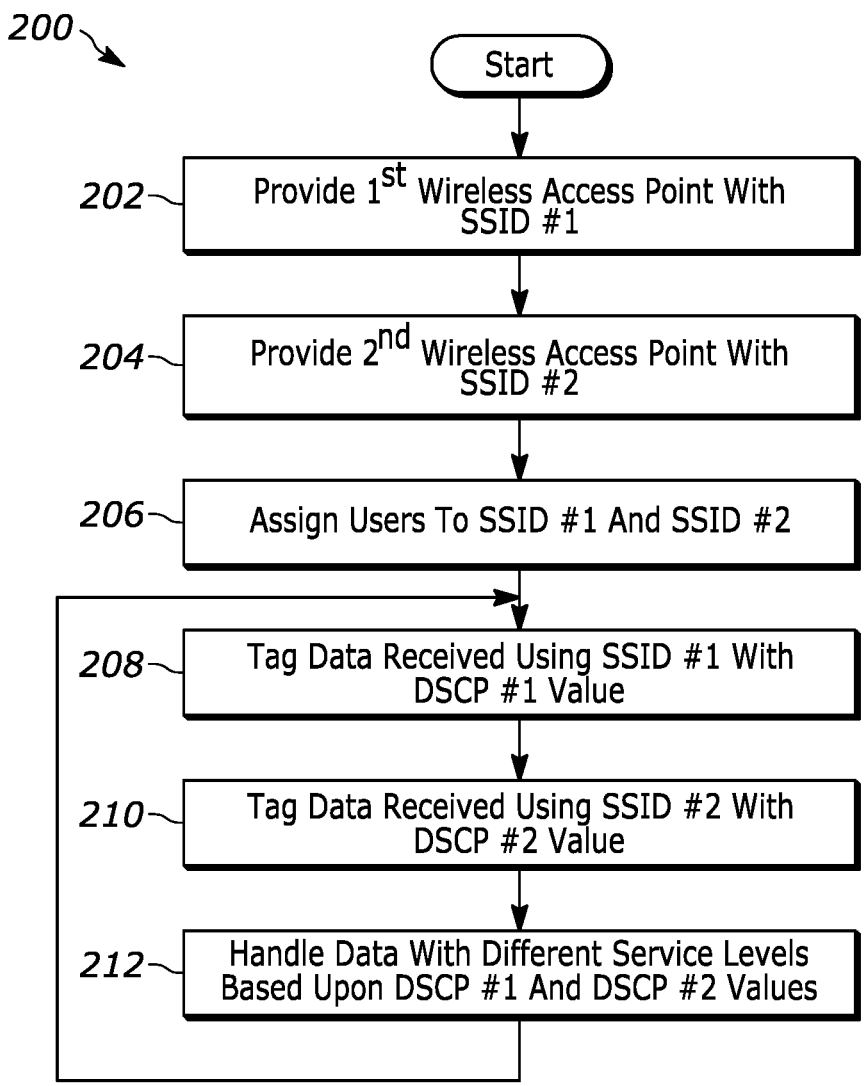
FIG. 2 is a flowchart representative of an example method for providing service levels for aircraft in-flight connectivity communication systems based upon SSIDs.

FIG. 2 is a flowchart 200 representative of example processes, methods, software, machine-readable instructions, etc. for implementing the terrestrial base station 110, the modems 114, the data center 112 and/or the routing engine 122 of FIG. 1. The processes, methods, software and instructions may be an executable program or portion of an executable program for execution by a processor such as the processor 302 of FIG. 3. The program may be embodied in software and/or machine-readable instructions stored on a non-transitory, machine-readable storage medium such as a compact disc (CD), hard disk drive (HDD), digital versatile disk (DVD), Blu-ray disk, cache, flash memory, read-only memory (ROM), random access memory (RAM), or any other storage device or storage disk associated with the processor 302 in which information may be stored for any duration (e.g., for extended time periods, permanently, for brief instances, for temporarily buffering, and/or for caching of the information). Further, although an example flowchart 200 is illustrated in FIG. 2, many other methods of implementing the terrestrial base station 110, the modems 114, the data center 112 and/or the routing engine 122 may alternatively be used. For example, the order of execution of the blocks may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), application specific integrated circuit (ASIC), programmable logic device (PLD), field programmable gate array (FPGA), field programmable logic device (FPLD), logic circuit, etc. structured to perform the corresponding operation(s) without executing software or instructions.

The program of FIG. 2 begins with providing a first wireless access point using a first SSID#1 (block 202) and providing a second wireless access point using a second SSID#2 (block 204). Users are segregated into different service level groups (e.g., owner, passenger, crew, etc.) by instructing them which SSID to use to access services (block 206). For example, passengers are instructed to use SSID #1, crew are instructed to use SSID #2, etc.

As data is received, the differentiated services code point (DSCP) value in the 8-bit differentiated services field (DS field) in the IP header of the data is set based upon the SSID according to the database 124. For example, data received using SSID #1 has its DSCP value set to DSCP #1 (block 208), data received using SSID #2 has its DSCP value set to DSCP #2 (block 210), etc.

The DSCP values are subsequently used to segregate users and/or provide different service levels (block 212). For example, DSCP values may be used to (i) control which type(s) of services a user may access, (ii) control the amount of data that may be sent, (iii) control the rate at which data may be sent, (iv) control, when multiple modems are available, the modem used to send data, (v) perform traffic engineering, (vi) control quality of service (QoS), (vii) to account for the amount of data sent, etc.

Figure 3:
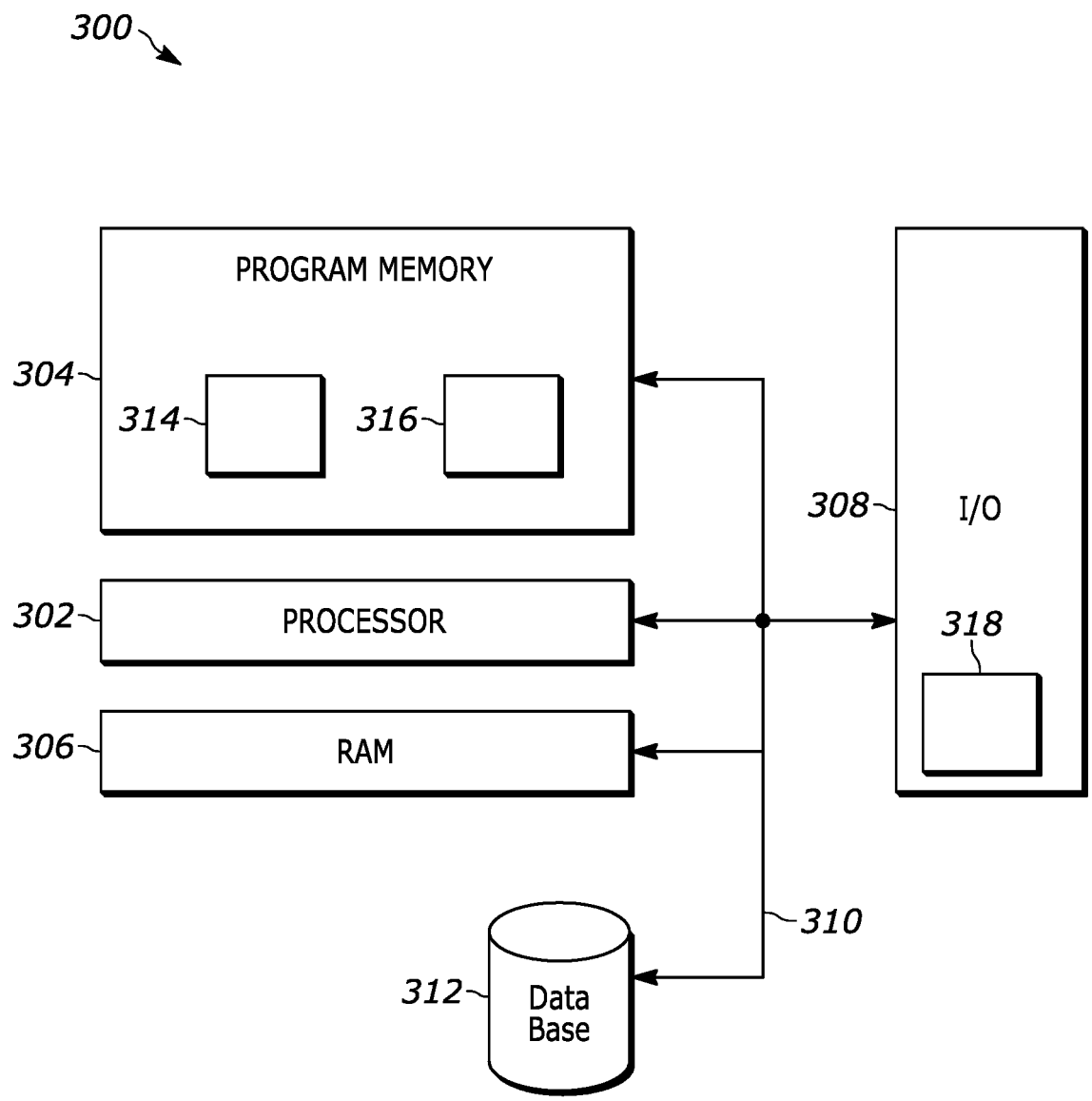
FIG. 3 is a block diagram of an example computing system to implement the various methods for providing service levels for aircraft in-flight connectivity communication systems based upon SSIDs, in accordance with the disclosed embodiments.

FIG. 3 is a block diagram of an example computing system 300 that may be used to implement all or part of the terrestrial base station 110, the data center 112, the modems 114, and/or the routing engine 122 of FIG. 1. The computing system 300 may be, for example, a server, a personal computer, a workstation, or any other type of computing device or system.

The computing system 300 includes a processor 302, a program memory 304, a RAM 306, and an input/output (I/O) circuit 308, all of which are interconnected via an address/data bus 310. It should be appreciated that although FIG. 3 depicts only one processor 302, the computing system 300 may include multiple processors 302. The processor 302 of the illustrated example is hardware, and may be a semiconductor based (e.g., silicon based) device. Example processors 302 include a programmable processor, programmable controller, graphics processing unit (GPU), digital signal processor (DSP), application specific integrated circuit (ASIC), programmable logic device (PLD), field programmable gate array (FPGA), field programmable logic device (FPLD), etc.

The program memory 304 may include any number and/or type(s) of non-transitory, volatile and/or non-volatile, machine-readable storage medium, devices or disks storing software or machine-instructions that may be executed by the processor 302 to implement all or part of an operating system, the terrestrial base station 110, the data center 112, the modems 114, and/or the routing engine 122. Modules, systems, etc. instead of and/or in addition to those shown in FIG. 3 may be implemented. The software or machine-readable instructions may be stored on separate non-transitory, machine-readable storage mediums, devices or disks, and/or at different physical locations.

Example memories 304, 314, 316 include any number and/or type(s) of volatile or non-volatile, non-transitory, machine-readable storage medium, devices or disks, such as a semiconductor memory, magnetically readable memory, optically readable memory, HDD, SSD, ROM (e.g., a ROM 316), RAM (e.g., a RAM 314), redundant array of independent disks (RAID) system, cache, flash memory, or any other storage medium, device or disk in which information may be stored for any duration (e.g., permanently, for an extended time period, for a brief instance, for temporarily buffering, for caching of the information, etc.).

As used herein, the term non-transitory, machine-readable storage medium is expressly defined to include any type of non-transitory, machine-readable storage device and/or storage disk and to exclude propagating signals and to exclude transmission media.

In some embodiments, the processor 302 may also include, or otherwise be communicatively connected to, a database 312 or other data storage mechanism (one or more of a HDD, optical storage drive, solid state storage device, CD, CD-ROM, DVD, Blu-ray disk, RAID, etc.). In the illustrated example, the database 312 may store the data 124 and/or 128.

The processing platform 300 of FIG. 3 includes one or more communication interfaces such as, for example, a network interface 318 and/or an input/output (I/O) interface 308. The communication interface(s) enable the processing platform 300 of FIG. 3 to communicate with, for example, another device, system, host system, datastore, or database (e.g., one or both of the datastores 124 and 128), or any other device, system, etc. of the communication system 100.

Although FIG. 3 depicts the I/O circuit 308 as a single block, the I/O circuit 308 may include a number of different types of I/O circuits or components that enable the processor 302 to communicate with peripheral I/O devices and/or other computing systems. Example interface circuits 308 include a universal serial bus (USB) interface, Bluetooth® interface, near field communication (NFC) interface, infrared interface and/or PCI express interface. The peripheral I/O devices may be any desired type of I/O device such as a keyboard, display (e.g., a liquid crystal display (LCD), cathode ray tube (CRT) display, light emitting diode (LED) display, organic light emitting diode (OLED) display, active-matrix organic light-emitting diode (AMOLED) display, in-place switching (IPS) display, touch screen, etc.), navigation device (e.g., a mouse, trackball, capacitive touch pad, joystick, etc.), speaker, microphone, printer, button, communication interface, antenna, etc. The I/O circuit 308 typically includes a graphics driver card, graphics driver chip and/or graphics driver processor to drive a display when a display is present.

The I/O circuit 308 may include a number of different network transceivers 318 that enable the computing system 300 to communicate with other computing systems, such as the computing system 300, that implement other portions of the communication system 100. The network transceiver 318 may be a TDMA, GSM, CDMA, GSM, LTE, WiMAX, Wi-Fi, etc. transceiver and/or may be associated with frequencies in the $K_a$ band, the $K_u$ band, the L band, and/or any other suitable wireless communication frequency bands.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Any references, including, but not limited to, publications, patent applications, and patents cited herein are hereby incorporated in their entirety by reference to the same extent as if each reference were individually and specifically indicated to be incorporated by reference and were set forth in its entirety herein.

It should be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method comprising:
providing a first wireless access point having a first service set identifier (SSID);
providing a second wireless access point having a second, different SSID;
segregating a plurality of users of electronic devices by providing respective instructions for presentation to first and second user groups from among the plurality of users regarding which of the first and second SSIDs to select to access services to cause first users in the first user group to use the first SSID and users in the second user group to use the second SSID, the instructions indicating which of the first and second SSIDs to manually select based upon whether the plurality of users belong to the first or second user groups;
tagging first data received using the first SSID with a first differentiated services code point (DSCP) value;
tagging second data received using the second SSID with a second, different DSCP value; and
handling the first and second data with different service levels based upon the first and second DSCP values, wherein handling the first and second data with different service levels includes routing data based upon the first and second DSCP values by routing the first data via a first modem and routing the second data via a second modem.

2. The method of claim 1, wherein handling the first and second data with different service levels includes performing traffic engineering based upon the first and second DSCP values.

3. The method of claim 1, wherein handling the first and second data with different service levels includes determining which services can be accessed based upon the first and second DSCP values.

4. The method of claim 1, wherein the handling of the first and second data with different service levels includes charging respective ones of the plurality of users for used data based upon which of the first and second DSCP values are associated with the used data.

5. A system comprising:
a first wireless access point having a first service set identifier (SSID);
a second wireless access point having a second, different SSID, wherein a plurality of users of electronic devices are segregated via the system providing respective instructions for presentation to first and second user groups from among the plurality of users regarding which of the first and second SSID to select to access services to cause first users in the first user group to use the first SSID and second users in the second user group to use the second SSID, the instructions indicating which of the first and second SSIDs to manually select based upon whether the plurality of users belong to the first or second user groups;
a routing engine configured to tag first data received via the first SSID with a first differentiated services code point (DSCP) value, and to tag second data received via the second SSID with a second, different DSCP value; and
a transport network configured to handle the first and second data with different service levels based upon the first and second DSCP values, wherein handling the first and second data with different service levels includes routing data based upon the first and second DSCP values by routing the first data via a first modem and routing the second data via a second modem.

6. The system of claim 5, wherein the transport network includes a modem configured to handle the first and second data with different service levels based upon the first and second DSCP values.

7. The system of claim 5, wherein the transport network includes a data center configured to handle the first and second data with different service levels based upon the first and second DSCP values.

8. The system of claim 5, wherein handling the first and second data with different service levels includes performing traffic engineering based upon the first and second DSCP values.

9. The system of claim 5, wherein handling the first and second data with different service levels includes determining which services can be accessed based upon the first and second DSCP values.

10. The system of claim 5, wherein the handling of the first and second data with different service levels includes charging respective ones of the plurality of users for used data based upon which of the first and second DSCP values are associated with the used data.

11. A non-transitory, machine-readable storage medium storing instructions that, when executed, cause a machine to:

provide respective instructions to first and second user groups from among a plurality of users of electronic devices, the respective instructions including instructions for presentation to the first user group to select a first service set identifier (SSID) and instructions for presentation to the second user group to select a second SSID, the instructions for presentation to the first and second user groups indicating which of the first and second SSIDs to manually select based upon whether the plurality of users belong to the first or second user groups;

receive first data tagged with a first differentiated services code point (DSCP) value based upon being received using the first SSID;

receive second data tagged with a second DSCP value based upon being received using the second SSID; and handle the first and second data with different service levels based upon the first and second DSCP values, wherein handling the first and second data with different service levels includes routing data based upon the first and second DSCP values by routing the first data via a first modem and routing the second data via a second modem.

12. The non-transitory, machine-readable storage medium of claim 11, including further instructions that, when executed, cause the machine to handle the first and second data with different service levels by performing traffic engineering based upon the first and second DSCP values.

13. The non-transitory, machine-readable storage medium of claim 11, including further instructions that, when executed, cause the machine to handle the first and second data with different service levels by determining which services can be accessed based upon the first and second DSCP values.

14. The non-transitory, machine-readable storage medium of claim 11, wherein the handling of the first and second data with different service levels includes charging respective ones of the plurality of users for used data based upon which of the first and second DSCP values are associated with the used data.

* * * * *